Oct. 10, 1944.  R. C. PIERCE  2,359,788
BRAKE ARRANGEMENT
Filed Oct. 1, 1942  2 Sheets-Sheet 2
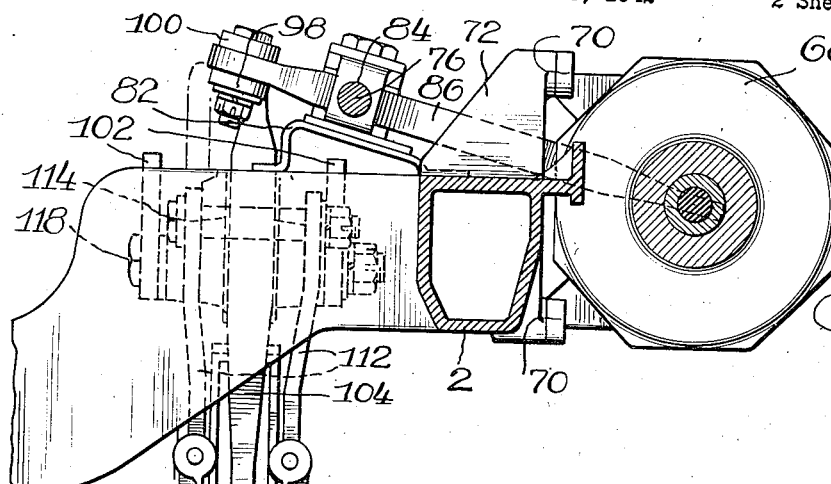
Fig.4
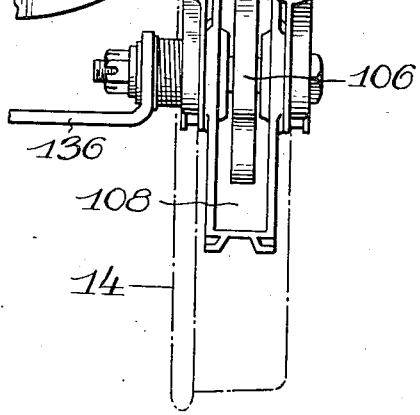
Fig.3
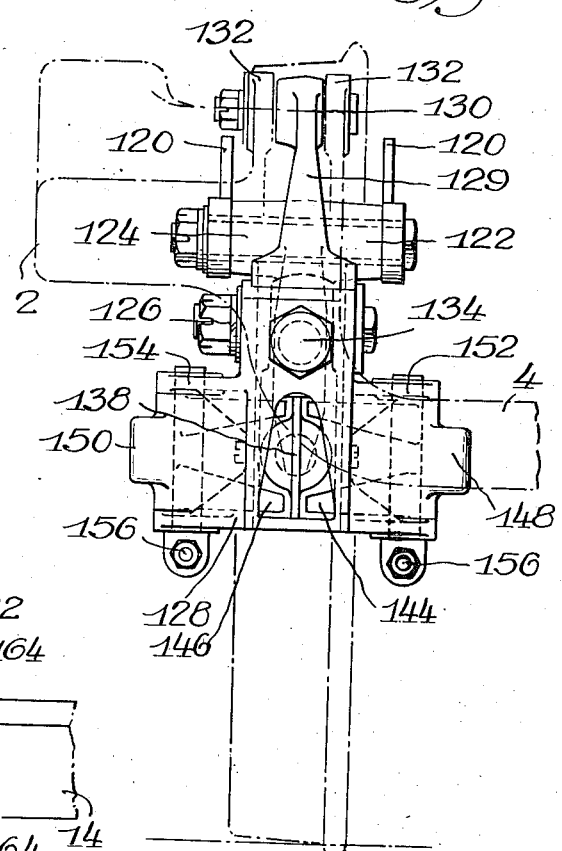
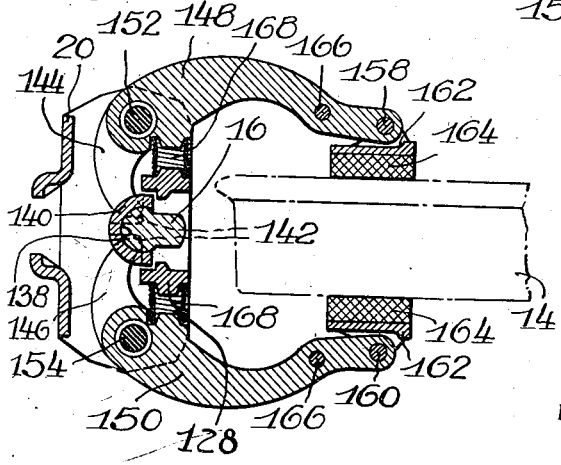
Fig.5
INVENTOR.
Raymond C. Pierce
BY Orvin O. B. Garner
Atty.

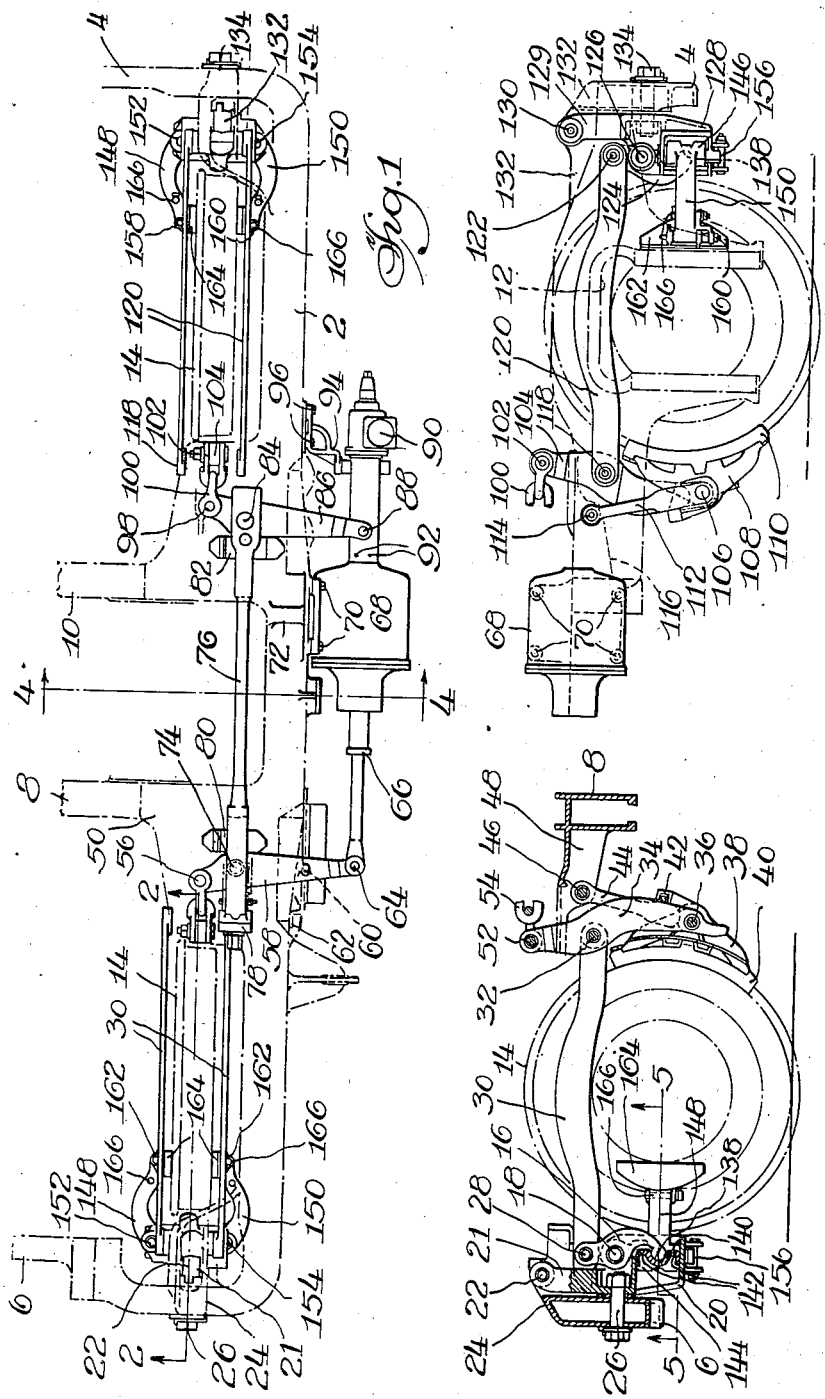

Patented Oct. 10, 1944

2,359,788

UNITED STATES PATENT OFFICE 2,359,788

BRAKE ARRANGEMENT

Raymond C. Pierce, Chicago, Ill.

Application October 1, 1942, Serial No. 460,355

24 Claims. (Cl. 188—33)

My invention relates to railway brake rigging and, particularly, to a novel form of braking arrangement for a four wheel railway car truck wherein metal brake shoes may be applied intermediate the wheels and composition brake shoes applied to inboard and outboard surfaces of the wheels at the opposite ends of the truck.

The general object of my invention is to devise such an arrangement that will be generally suitable for application to four wheel railway car trucks by meeting the various standards imposed on such equipment and, at the same time, affording a practical arrangement from a manufacturing standpoint.

A more specific object of my invention is to devise a brake arrangement for a four wheel railway car truck of so-called unit cylinder type wherein power means may be mounted on each side of the truck for actuation of brake rigging for the adjacent side of the truck and in which the brake rigging may include a compact arrangement for application of composition shoes to inboard and outboard surfaces of each wheel adjacent the extremities of the truck, thus affording convenient access for application, inspection, or dismantling.

My invention comprehends such an arrangement as that described wherein power means mounted on each side frame may actuate adjustably interconnected live and dead cylinder levers and wherein each cylinder lever may operate brake mechanism associated with an adjacent wheel. In the arrangement contemplated, the brake mechanism associated with each wheel includes a single metal shoe application and a clasp arrangement of composition shoes applied at the opposite side of the wheel.

In the drawings,

Figure 1 is a top plan view of a car truck and brake arrangement embodying my invention, only one-half of the truck structure being illustrated inasmuch as the arrangement is similar at opposite sides thereof.

Figure 2 is a side elevation of the truck and brake arrangement shown in Figure 1, partly in section, the section being taken approximately in the longitudinal vertical plane indicated by the line 2—2 of Figure 1.

Figure 3 is an enlarged end view of the arrangement shown in Figures 1 and 2, taken from the right as seen in said figures.

Figure 4 is an enlarged sectional view taken in the transverse vertical plane bisecting the truck approximately as indicated by the line 4—4 of Figure 1, and Figure 5 is a sectional view through a portion of the clasp brake mechanism actuating the composition shoes, the section being taken in the horizontal plane approximately as indicated by the line 5—5 of Figure 2.

For the sake of clarity, in each figure of the drawings certain details may be shown in elevation instead of section or may be omitted entirely where more clearly shown in other views.

My novel brake arrangement is shown as applied to a truck frame of well-known form comprising the side rail 2, end rails 4 and 6, and spaced transoms 8 and 10 affording the usual means of support for the car body carrying bolster. Adjacent each end, the side frame 2 may have a pedestal opening 12 affording the usual means of connection to journal ends (not shown) of wheel and axle assemblies 14, 14, and associated with each side frame may be an equalizing arrangement of well-known form (not shown).

My novel brake rigging may include the dead brake lever 16 fulcrumed intermediate its ends as at 18 from the casting 20, the bossed extremity of the upwardly projecting arm 21 of which may be supported as at 22 from the bracket 24 integrally formed as a part of the end rail 6 adjacent its juncture with the side rail 2, said casting also being secured as at 26 to said end rail 6. The lower end of the dead brake lever 16 is forged to somewhat arcuate shape as seen in plan in Figure 2 and serves to actuate the clasp brake means associated with the composition brake shoes at one end of the truck, said clasp brake means being described in detail hereinafter.

The upper end of the dead brake lever 16 may have pivotal connection as at 28 with the paired inboard and outboard straps 30, 30 which extend over the adjacent axle and may have their opposite ends pivotally connected as at 32 to a point intermediate the ends of the live brake lever 34, and the lower end of said live brake lever 34 may have pivotal connection as at 36 to the brake head 38 carrying the brake shoe 40, said brake head having balancing means 42 of well-known form. Also connected at the pivot point 36 may be the lower end of the brake hanger 44 and the upper end thereof may be hung as at 46 from the bracket 48 formed as an integral part of the gusset 50 at the juncture of the transom 8 and the side rail 2.

The upper end of the live truck lever 34 may have pivotal connection as at 52 with clevis means 54, and the opposite end of said clevis means may have pivotal connection as at 56 to the diagonally and transversely arranged live cylinder lever 58, said cylinder being guided as at 60 against lateral movement by the adjacent bracket 62 mounted on the side member 2. The outboard end of the live cylinder lever 58 may have pivotal connection as at 64 to the piston 66 of the power means or brake cylinder 68 which may be supported as at 70, 70 from the bracket 72 integrally formed with the side rail 2 for that purpose.

Intermediate the ends of the live cylinder lever 58 may be pivotally and adjustably connected as at 74 the pull rod 76, said pull rod having at one end thereof the manual slack adjuster 78 and the adjacent end of said pull rod being afforded guiding means by the adjacent bracket 80 mounted on the top of the frame. The opposite end of the pull rod 76 may be similarly guided by the bracket 82 (Figure 4) and may have pivotal and adjustable connection as at 84 to the diagonally arranged dead cylinder lever 86 whose outboard extremity may have pivotal and automatically adjustable connection as at 88 to the slack adjuster 90 which may be mounted as at 92 on the power means 68 and supported from the side frame by the bracket 94 mounted thereon as at 96, 96. The inboard end of the dead cylinder lever 86 may have pivotal connection as at 98 with the clevis means 100, and the opposite end of said clevis means may be pivotally connected as at 102 to the live truck lever 104, the lower end of which may have pivotal connection as at 106 to the brake head 108 carrying the brake shoe 110. Also connected at the pivot point 106 may be the brake hanger 112 supported at its upper end as at 114 from the bracket 116 depending from the frame.

Intermediate the ends of the live brake lever 104 may be pivotally connected as at 118 the paired inboard and outboard straps 120, 120, said straps extending over the adjacent axle and having their opposite ends pivotally connected as at 122 to the bossed upper end of the dead brake lever 124, said dead brake lever being fulcrumed intermediate its ends as at 126 from the casting 128, the upwardly projecting arm 129 of which may be supported as at 130 from the bracket 132 integrally formed with the end rail 4 adjacent its juncture with the side member 2. The casting 128 may also be secured as at 134 to the end rail 4 and may afford support for the clasp brake means actuating the composition brake shoes for the adjacent wheel and operatively connected to the lower end of said dead brake lever 124.

Intermediate the wheels, the corresponding brake heads at opposite sides of the truck may be connected by a tie strap 136 secured at the pivot point of the brake head, as well illustrated at 106 in Figure 4.

The clasp brake means for operating the composition shoes is the same at each end of the rigging, as best illustrated in the sectional views of Figures 2 and 5, and is actuated by a ball and socket connection with the lower extremity of the adjacent dead truck lever, as well shown at 138 in said figures.

It may be noted that the ball extremity at the lower end of the dead brake lever has universal engagement with the equalizer casting 140 partly housed in the casting 128 as best seen in Figure 5, and on the opposite face of said casting 140 at each side of the socket at 138 may be afforded top and bottom seats as at 142, 142 for the extremities of the bifurcated arms 144 and 146 of the inboard and outboard tong-like or bell crank levers 148, 150 (Figure 5). Said tong levers may be fulcrumed intermediate their ends as at 152 and 154 from vertical pins mounted in the adjacent casting and removably supported at their lower ends as at 156, 156. Each of the bell crank levers 148, 150 may pivotally support at its opposite end as at 158 and 160 a brake head 162 carrying a composition brake shoe 164 for engagement with the adjacent annular face formed on the inboard and outboard surfaces of the adjacent wheel. Each brake head 162 may be afforded a known type of balancing means as at 166. Release means for the respective bell crank levers may be afforded at 168, 168 in the form of compression springs mounted between adjacent walls of the support casting and seats afforded on said bell crank levers as well illustrated in Figure 5.

An important feature of applicant's invention, as will be readily understood by those skilled in the art, is the bell crank and equalizer connection afforded between each brake lever and the associated brake shoes by means of which relative lateral motion is permitted between the frame and the wheel and axle assembly. In other words, a study of Figure 5 will make clear how the brake shoes 164, 164 may be maintained in normal position with respect to the wheel 14 under such lateral movement as normally may occur between the member 128 which is supported on the frame and the wheel. This is an important feature of my invention.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement for a railway car truck, a frame having a side member, power means thereon, spaced supporting wheel and axle assemblies, brake rigging for the wheels at each side of the truck comprising interconnected cylinder levers connected at corresponding ends to opposite ends of said power means, and braking means for each wheel operatively connected at the other ends of said cylinder levers respectively, each of said braking means comprising a live truck lever intermediate the wheels, a dead truck lever at the adjacent end of the truck, straps connecting said truck levers, a metal brake shoe supported from said live truck lever for engagement with the tread surface at one side of the wheel, and clasp brake means supported at the opposite side of the wheel and operatively connected to said dead truck lever, said clasp brake means comprising an equalizer member having a ball and socket joint with said dead truck lever, and inboard and outboard bell crank levers operatively connected to said equalizer member, said bell crank levers supporting composition brake shoes for engagement with parallel inboard and outboard faces on said wheel.

2. In a brake arrangement for a railway car truck, a frame having a side member, power means thereon, spaced supporting wheel and axle assemblies, brake rigging for the wheels at each side of the truck comprising interconnected cylinder levers connected at corresponding ends to opposite ends of said power means, and braking means for each wheel operatively connected at the other ends of said cylinder levers respectively, each of said braking means comprising a live truck lever intermediate the wheels, a dead truck lever at the adjacent end of the truck, straps connecting said truck levers, a metal brake shoe supported from said live truck lever for engagement with the tread surface at one side of the wheel, clasp brake means supported at the opposite side of the wheel and operatively connected to said dead truck lever, said clasp brake means comprising an equalizer member having a ball and socket joint with said dead truck lever and inboard and outboard bell crank levers operatively connected to said equalizer member, said bell crank levers supporting composition brake shoes for engagement with parallel inboard and outboard faces on said wheel, and release means associated with said clasp brake means.

3. In a brake arrangement for a railway car truck, a frame having a side member, power means thereon, spaced supporting wheel and axle assemblies, brake rigging for the wheels at each side of the truck comprising interconnected cylinder levers connected at corresponding ends to opposite ends of said power means, and braking means for each wheel operatively connected at the other ends of said cylinder levers respectively, each of said braking means comprising a live truck lever intermediate the wheels, a dead truck lever at the adjacent end of the truck, straps connecting said truck levers, a metal brake shoe supported from said live truck lever for engagement with the tread surface at one side of the wheel, and clasp brake means supported at the opposite side of the wheel and operatively connected to said dead truck lever, said clasp brake means comprising an equalizer member having a ball and socket joint with said dead truck lever and inboard and outboard bell crank levers operatively connected to said equalizer member, said bell crank levers supporting composition brake shoes for engagement with parallel faces on said wheel.

4. In a brake arrangement for a railway car truck, a frame having a side member, power means thereon, spaced supporting wheel and axle assemblies, brake rigging for the wheels at each side of the truck comprising interconnected cylinder levers connected at corresponding ends to opposite ends of said power means, and braking means for each wheel operatively connected at the other ends of said cylinder levers respectively, each of said braking means comprising a live truck lever intermediate the wheels, a dead truck lever at the adjacent end of the truck, straps connecting said truck levers, a metal brake shoe supported from said live truck lever for engagement with the tread surface at one side of the wheel, and clasp brake means supported at the opposite side of the wheel and operatively connected to said dead truck lever, said clasp brake means comprising an equalizer member having a ball and socket joint with said dead truck lever and inboard and outboard bell crank levers operatively connected to said equalizer member.

5. In a brake arrangement for a four wheel railway car truck, a frame, spaced supporting wheel and axle assemblies, power means mounted on the side of said frame, brake rigging at the adjacent side of the truck comprising interconnected live and dead cylinder levers connected at corresponding ends to opposite ends of said power means, braking means associated with each wheel and connected at the other ends of said cylinder levers respectively, each of said braking means comprising live and dead truck levers supported at opposite sides of the wheel, and over-axle straps connecting said levers, said live truck lever supporting a metal brake shoe for engagement with the tread of the wheel and said dead truck lever actuating clasp brake means for the wheel, said clasp brake means including bell crank levers supported from said frame and engaging an equalizing member, said equalizing member having operative connection to the adjacent dead truck lever, said last-mentioned connection being in the form of a ball and socket joint.

6. In a brake arrangement for a four wheel railway car truck, a frame, spaced supporting wheel and axle assemblies, power means mounted on the side of said frame, brake rigging at the adjacent side of the truck comprising interconnected live and dead cylinder levers connected at corresponding ends to opposite ends of said power means, braking means associated with each wheel and connected at the other ends of said cylinder levers respectively, each of said braking means comprising live and dead truck levers supported at opposite sides of the wheel, and straps connecting said levers, said live truck lever supporting a metal brake shoe for engagement with the tread of the wheel and said dead truck lever actuating clasp brake means for the wheel, said clasp brake means including bell crank levers supported from said frame and engaging an equalizing member, said equalizing member having operative connection to the adjacent dead truck lever.

7. In a brake arrangement for a railway car truck, a frame, spaced supporting wheel and axle assemblies, power means on said frame, braking means for each wheel, operative connections between the braking means at each side of the truck and the adjacent power means, each of said braking means comprising interconnected live and dead truck levers at opposite sides of the wheel, one of said truck levers supporting a metal brake shoe for engaging the tread of the wheel and the other of said truck levers having operative connection to clasp brake means at the opposite side of the wheel, said clasp brake means comprising an equalizer member having a ball and socket connection to the adjacent truck lever, bell crank levers operatively connected to said equalizer member, and composition brake shoes mounted on said bell crank levers for engagement with inboard and outboard faces of the adjacent wheel.

8. In a brake arrangement for a railway car truck, a frame, spaced supporting wheel and axle assemblies, power means on said frame, braking means for each wheel, operative connections between the braking means at each side of the truck and the adjacent power means, each of said braking means comprising truck levers supported at opposite sides of the wheel, a metal brake shoe supported from one of said truck levers for engagement with the tread of the wheel, clasp brake means at the opposite side of the wheel operatively connected to the other of said truck levers, said clasp brake means comprising an equalizer member, inboard and outboard bell crank levers operatively connected to said equalizer member, composition brake shoes mounted on said crank levers for engagement with inboard and outboard faces of said wheel, and release means for each of said bell crank levers.

9. In a brake arrangement for a railway car truck, a frame having a side member, power means thereon, spaced supporting wheel and axle assemblies, brake rigging for the wheels at each side of the truck comprising interconnected cylinder levers connected at corresponding ends to opposite ends of said power means, and braking means for each wheel operatively connected at the other ends of said cylinder levers respectively, each of said braking means comprising a live truck lever intermediate the wheels, a dead truck lever at the adjacent end of the truck, straps connecting said truck levers, a metal brake shoe supported from said live truck lever for engagement with the tread surface at one side of the wheel, clasp brake means supported at the opposite side of the wheel and operatively connected to said dead truck lever, and release means associated with said clasp brake means.

10. In a vehicle, a frame member, a supporting wheel and axle assembly comprising an axle with a rotatable member thereon, friction shoes adapted to engage inboard and outboard surfaces on said rotatable member, and actuating means for said shoes comprising an operating member adapted to move in a plane longitudinally of the frame member, and lever members carrying the friction shoes, said lever members being adapted to move laterally of the frame member and being operatively connected to said operating member, said operative connection comprising means equalizing pressure by said friction means against said rotatable member during relative lateral movement thereof with respect to the frame member, said equalizing means including a ball and socket connection with said operating member.

11. In a brake arrangement for a railway car truck, a frame, spaced supporting wheel and axle assemblies, power means, braking means for each wheel, operative connections between the braking means at each side of the truck and the adjacent power means, each of said braking means comprising truck levers supported at opposite sides of the wheel, a metal brake shoe supported from one of said truck levers for engagement with the tread of the wheel, and clasp brake means at the opposite side of the wheel operatively connected to the other of said truck levers, said operative connection comprising a ball and socket joint.

12. In a brake arrangement for a railway car truck comprising spaced wheel and axle assemblies, braking means for each wheel comprising a brake shoe engaging the tread surface at one side of the axle, clasp brake means with shoes engaging inboard and outboard faces at the opposite side of the axle, said clasp brake means including an equalizer member, bell crank levers connected thereto, and actuating means for said equalizer including a brake lever having a ball and socket connection therewith, each of said bell crank levers engaging said equalizer above and below said socket.

13. In a brake arrangement for a railway car truck comprising a wheel and axle assembly, braking means for each wheel comprising a brake shoe engaging the tread surface at one side of the axle, clasp brake means engaging inboard and outboard faces at the opposite side of said axle. said clasp brake means comprising an equalizer, bell crank levers operatively engaging said equalizer, and a brake lever having a universal joint connection with said equalizer for actuation thereof.

14. In a clasp brake arrangement, bell crank levers fulcrumed at spaced points, an equalizer intermediate said points having a socket for universal joint connection to associated operating means, and connections between said equalizer and the respective bell crank levers.

15. In a clasp brake arrangement, bell crank levers fulcrumed at spaced points, and an equalizer intermediate said points having a socket for connection to associated operating means, each of said bell crank levers engaging said equalizer at spaced points at respective sides of said socket.

16. In a clasp brake arrangement, a support casting, bell crank levers fulcrumed at spaced points from said casting, an equalizer operatively connected intermediate said spaced points to respective levers, and operating means fulcrumed from said casting and connected to said equalizer.

17. In a brake arrangement, a truck frame, a supporting wheel, a casting hung from said frame, and clasp brake means for said wheel including levers fulcrumed at spaced points from said casting and supporting brake shoes for engagement with opposite sides of said wheel, an equalizer operatively engaging adjacent ends of said levers, a brake lever fulcrumed from said casting for actuation of said equalizer, and release means associated with said casting for each of said first-mentioned levers.

18. In a brake arrangement, a vehicle frame, a supporting wheel and axle assembly comprising an axle and a member rotatable therewith, friction shoes for engagement with opposite sides of said member, bell crank levers connected at corresponding ends to respective shoes, means suspended from said frame and affording a fulcrum for said levers intermediate their ends, an equalizer member abutting the opposite corresponding ends of said bell crank levers, means affording slidable support for said equalizer member, actuating means for urging said equalizer member against said opposite ends whereby said shoes are engaged with said rotatable member, and means affording a rocking movement between said equalizer member and said opposite corresponding ends during relative lateral movement between said assembly and said frame while said shoes are engaged with said rotatable member.

19. In a brake arrangement, a vehicle frame, a supporting wheel and axle assembly comprising an axle and a member rotatable therewith, friction shoes for engagement with opposite sides of said member, bell crank levers connected at corresponding ends to respective shoes, means suspended from said frame and affording a fulcrum for said levers intermediate their ends, an equalizer member abutting the opposite corresponding ends of said bell crank levers, means affording slidable support for said equalizer member, and actuating means for urging said equalizer member against said opposite ends whereby said shoes are engaged with said rotatable member.

20. In a brake arrangement, a vehicle frame, a supporting wheel and axle assembly comprising an axle and a concentric member rotatable therewith, friction shoes for engagement with the sides of said member, bell crank levers engaged at corresponding ends with respective shoes, an equalizer member in abutment with opposite corresponding ends of said bell crank levers, a fulcrum for said bell crank levers intermediate the ends thereof, means affording a slidable support for said equalizer member, an upstanding lever fulcrumed from said frame and pivotally connected to said equalizer member, and actuating means associated with said upstanding lever.

21. In a brake arrangement, a vehicle frame, a supporting wheel and axle assembly comprising an axle and a concentric member rotatable therewith, brake shoes for engagement with opposite sides of said member, bell crank levers connected at corresponding ends to respective shoes and at opposite corresponding ends to actuating means, and fulcrums for said levers intermediate the ends thereof, said actuating means comprising an equalizer member abutting said opposite corresponding ends.

22. In a brake arrangement for a railway car truck, a truck frame, a supporting wheel and axle assembly comprising a wheel, a fulcrum casting supported from said frame adjacent said wheel, bell crank levers fulcrumed intermediate their ends from said casting and carrying friction means at their corresponding ends for engagement with inboard and outboard surfaces of said wheel, an equalizer slidably supported from said casting and bearing against arcuate surfaces formed on the opposite corresponding ends of said bell crank levers, and actuating means for said equalizer.

23. In a brake arrangement for a railway car truck, a truck frame, a supporting wheel and axle assembly comprising a wheel, a fulcrum casting supported from said frame adjacent said wheel, bell crank levers fulcrumed intermediate their ends from said casting, friction means supported from corresponding ends of said levers for engagement with opposite sides of said wheel, an equalizer member slidably supported from said casting and bearing against the opposite corresponding ends of said bell crank levers, and actuating means comprising a substantially vertical truck lever operatively connected to said equalizer member.

24. In a brake arrangement for a railway car truck, a truck frame, a supporting wheel and axle assembly comprising a wheel, a fulcrum casting supported from said frame adjacent said wheel, bell crank levers fulcrumed intermediate their ends from said casting, friction means supported from corresponding ends of said levers for engagement with opposite sides of said wheel, an equalizer member slidably supported from said casting and bearing against the opposite corresponding ends of said bell crank levers, and actuating means comprising interconnected live and dead truck levers at opposite sides of said assembly, said dead truck lever being connected to said equalizer member, and said live truck lever actuating friction means for engagement with said wheel.

RAYMOND C. PIERCE.